United States Patent [19]

Poultney

[11] Patent Number: 5,563,709
[45] Date of Patent: Oct. 8, 1996

[54] APPARATUS FOR MEASURING, THINNING AND FLATTENING SILICON STRUCTURES

[75] Inventor: Sherman K. Poultney, Wilton, Conn.

[73] Assignee: Integrated Process Equipment Corp., Phoenix, Ariz.

[21] Appl. No.: 304,983

[22] Filed: Sep. 13, 1994

[51] Int. Cl.$^6$ .................................................. G01B 11/30
[52] U.S. Cl. .................................................. 356/371
[58] Field of Search ...................................... 356/371, 376, 356/382; 156/626.1

[56] References Cited

U.S. PATENT DOCUMENTS

| | | | |
|---|---|---|---|
| 4,479,848 | 10/1984 | Otsubo et al. | 156/626.1 |
| 5,094,536 | 3/1992 | MacDonald et al. | 356/358 |
| 5,333,049 | 7/1994 | Ledger | 356/355 |
| 5,393,370 | 2/1995 | Ohta et al. | 156/626.1 |
| 5,450,205 | 9/1995 | Sawin et al. | 356/382 |

*Primary Examiner*—Richard A. Rosenberger
*Attorney, Agent, or Firm*—Cahill, Sutton & Thomas P.L.C.

[57] ABSTRACT

A system is provided for processing wafers, such as silicon and silicon-on-insulator wafers. The processing includes thinning and flattening of the wafers at a work station located directly beneath a down looking metrology apparatus for directing light onto the wafer and measuring the light wavefronts reflected from the wafer. The metrology apparatus for flattening includes the feature of a multiple lens array for arranging the reflected wavefronts into a plurality of light spots, and a charge-coupled-device light responsive device for receiving the light spots and determining the shape of the wavefronts. The system also provides a wafer transport system for moving one or more wafers into one or more work stations beneath the metrology apparatus in a vacuum chamber.

12 Claims, 7 Drawing Sheets

APPARATUS FOR MEASURING, THINNING AND FLATTENING SILICON STRUCTURES

FIELD OF THE INVENTION

The present invention relates generally to apparatus for wafer processing including measuring, thinning and flattening both silicon and SOI wafers, and more particularly to metrology apparatus for optically sensing the height wavefronts from a silicon wafer to determine the total thickness variations of the wafer, for thinning and/or flattening the wafers and for mechanically transporting and placing one or more wafers directly below the metrology apparatus.

In silicon wafer and silicon-on-insulator (SOI) wafer processing, metrology apparatus is used to measure thickness variations and wafers are conventionally sent to a separate station for thinning and flattening, such as by a plasma assisted chemical etching (PACE) wafer thinning and flattening machine. Apparatus for obtaining silicon wafer flattening data include Micro-PMI and capacitance thickness measurement structures. A structure available in the art for sensing wavefronts reflected from an object such as a silicon wafer is the Hartmann-Shack Wavefront Sensor. Apparatus for obtaining SOI wafer thinning data include SOI metrology apparatus. Use of a separate metrology apparatus can slow down wafer processing and does require a sophisticated co-registration scheme for overlapping a metrology map into shaping station coordinates.

Hartmann wavefront sensing is a method of determining wavefront error through slope measurement. In the classical Hartmann test, a mask of sub-apertures or holes arranged in a square pattern is used to sample the wavefront at the pupil of the optical focus. This array of spots can be thought of as a physical realization of an optical ray trace. The deviation of a spot from its expected location provides information on the wavefront over the sub-aperture and depends only on the average slope of the wavefront over the sub-aperture. In the publication by K. Kwo, G. Damas, W. Zmek and M. Haller entitled A. Hartmann-Schack Wavefront Sensor Using A Binary Optic Lenslet Array, SPIE Vol. 1544 Miniature and Micro-optics: Fabrications and System Applications (199) 0-8194-0672-4/91 pages 66 through 74 a Hartmann-Shack wavefront sensor is described that uses a 65×50 element binary optic lens array as shown in FIG. 4 as the wavefront sampling element. The inherent accuracy and versatility of the lithographic process has reduced sampling and calibration errors associated with classic Hartmann sensing by allowing the lens array geometry to be tailored a CCD detector geometry with extreme precision. Combined with a quad-cell centroiding algorithm and wavefront reconstruction routines based on the successive over relation (SOR) algorithm, a wavefront sensor with sub-micron spot position accuracy, uniform response curves for all spots in the array, high dynamic range, and relative insensitivity to laboratory environmental vibrations is obtained. With the Hartmann-Shack method, the wavefront at the pupil is sampled by an array of lenses as illustrated in FIG. 4, and the resulting focal plane spots are imaged onto a CCD array, where a number of algorithms are available for calculating the location of the spot centroids. Once the relative spot positions are known, the wavefront can be reconstructed va a number of reconstruction methods. FIG. 5 illustrates the hardware associated with the wavefront sensor. The key element of the wavefront sensor is the 65×50 element binary optic lens array fabricated via a photolithographic process. The lens spacing of the array was designed to be commensurate with the pixel pitch of the CCD array and to allow the maximum number of samples yet minimize interaction between spots. The roughly square lenslets were designed for the HeNe wavelength of 633 nm and form spots with sinc-squared profiles. Each spot subtends a group of pixels which provides the capability for quad-cell centroiding. With the quad-cell algorithm, the sensor for accommodate spot motions of $\pm 1$ spot diameter, which translates to a dynamic range of roughly 7 waves rms of defocus. With the lenslet array mounted before the CCD array and the only remaining hardware consisting of pupil relay optics, a fast framegrabber and a PC computer, the result is a very compact instrument.

SUMMARY OF THE INVENTION

The invention provides embodiments that comprise metrology apparatus including Hartmann-Shack Sensor configurations to obtain thickness variations of an object such as a wafer and for mechanically positioning the metrology apparatus over the wafer for down-looking, full field viewing during thinning and flattening processes.

An object of the present invention is to provide a down-looking SOI metrology apparatus located above a thinning apparatus.

Another object of the present invention is to provide a metrology apparatus disposed above a wafer in a work station for directing light down onto the wafer for measuring the light wavefronts reflected from the wafer thereby eliminating the need to co-register a metrology map and work station coordinates.

Still another object of the present invention is to provide a down-looking wafer flattening metrology apparatus located above a flattening apparatus for measuring wafer total thickness variation, fabrication tool footprints, and fabrication tool co-registration.

Still another object of the present invention is to provide a SOI metrology apparatus incorporating modified Hartmann-Shack wavefront sensing structure in order to measure silicon wafer flatness.

A further object of the present invention is to provide a metrology apparatus for obtaining thickness variations of a wafer held down by a chuck that employs a binary optic lenslet array responsive to wavefronts reflected from the wafer surface.

Still a further object of the present invention is to provide metrology apparatus for calibrating PACE tool footprints and other patterns etched in regular wafers.

A yet further object of the present invention is to provide a metrology apparatus that employs a charge-coupled-device responsive to reflected wafer surface wavefronts transmitted through a binary optic lenslet array.

BRIEF DESCRIPTION OF THE DRAWINGS

The above set forth and other features of the invention are made more apparent in the ensuing Detailed Description of the Invention when read in conjunction with the attached drawings, wherein.

DETAILED DESCRIPTION OF THE INVENTION

Figure 1:
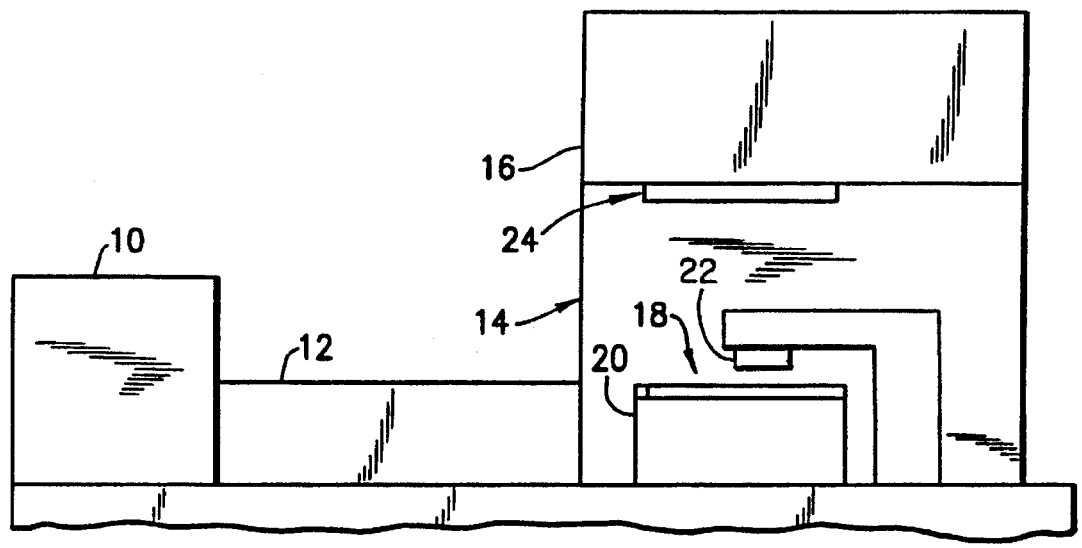
FIGS. 1 and 2 respectively are side and plan views of a portion of a wafer thinning and flattening machine.

Referring to FIG. 1, a side view schematic diagram of apparatus for measuring, thinning and flattening both silicon and silicon-on-insulator (SOI) wafers is shown including an input/output (I/O) vacuum cassette station 10, a vacuum robot chamber 12, and a processing stage 14 wherein a metrology unit 16 is disposed directly over a wafer chuck 18 and rotating platen 20.

A tool 22, referred to as a plasma-assisted chemical etching (PACE) shaper device, is proximate the wafer chuck 18 (either a vacuum or electrostatic type chuck) and platen 20. A window 24 is provided in the metrology unit 16 to permit the passage of light onto a wafer place on wafer chuck 18.

Figure 2:
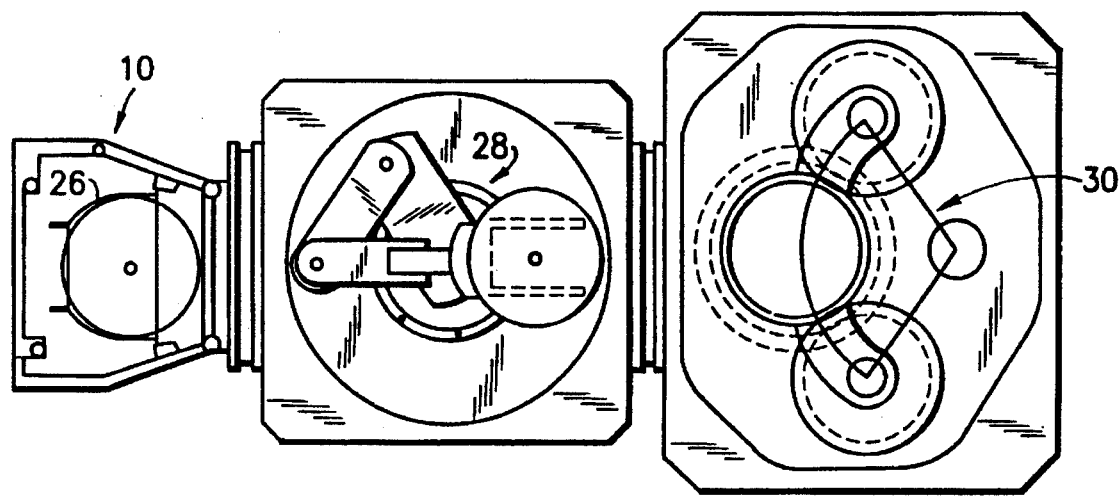

A wafer, either a relatively thick silicon wafer or a SOI wafer containing a relatively thin silicon layer, is entered into I/O vacuum cassette station 10 and disposed on a support 26 as shown in FIG. 2. An articulated robot arm 28 in vacuum robot chamber 12 moves the wafer from I/O vacuum cassette station 10 and onto the wafer chuck 18 in processing stage 14. A wafer is now located below the window 14 of metrology unit 16. Platen 20 is rotatable, and along with the wafer chuck 18. The PACE shaper device is contained on a swing arm 30 so that the platen rotation and swing arm movements combine to produce a spiral path for the wafer on the chuck. The metrology unit 16 can measure the wafer immediately prior to and after the PACE shaping.

Figure 3:
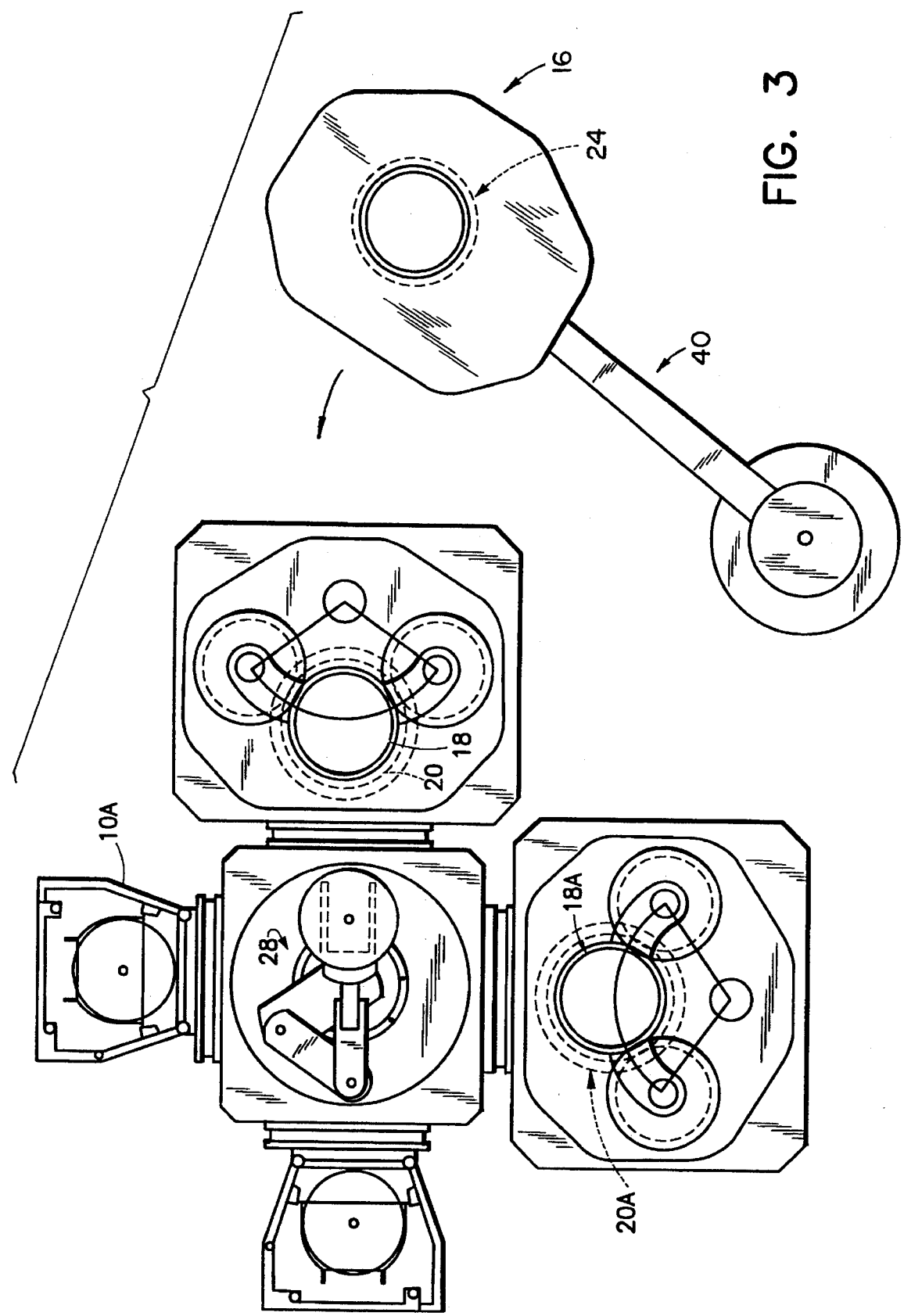
FIG. 3 is a plan view of a portion of another wafer thinning and flattening machine according to the present invention.

FIG. 3 illustrates a modification of the apparatus of FIG. 1, wherein a second I/O vacuum cassette station 10A and a second wafer chuck 18A and rotating platen 20A are included so that a second wafer can be set up for processing with a second PACE tool. The deployment of metrology above two (or more) PACE shaper tools maximizes wafer throughput and minimizes the need for wafer handling.

In FIG. 3, deployment is shown for a mechanical arm 40 moving the one metrology unit alternately from one PACE unit to the other. One PACE unit would etch a wafer while the metrology unit measured the wafer (before and after etch) in the other PACE unit. An optical mirror means could also be used to allow metrology unit to view each work station.

When the wafer in wafer chuck 18 is a SOI wafer, the application is a "thinning" process of the silicon layer on the insulator substrate. A full-wafer SOI metrology unit, described in U.S. patent application Ser. No. 07/804,872 entitled Apparatus and Method For Measuring The Thickness Of Thin Film Using Full Aperture Irradiation, filed December 1991, by Ledger. In this SOI metrology, the thin silicon layer is light transparent and the metrology unit measures the silicon thickness by using light beams reflected from the top and bottom of the silicon layer. These measurements are employed for thinning the silicon by a PACE thinning tool. Instead of performing the metrology process separate from the thinning process in two different places according the procedure used heretofore, the SOI metrology is placed as shown in FIG. 1 directly above the wafer to be processed by the tool 22. Thus, a down-looking, full wafer view is provided while the SOI wafer is in situ for thinning by the PACE shaper tool 22. The apparatus of FIG. 1 allows full field viewing of the wafer before and after processing, and further allows wafer co-registration to be done in a straight forward and certain manner.

The apparatus of FIG. 1 can also be used for "flattening" thick silicon wafers. In the flattening process, the metrology measures the thickness of the silicon wafer (which is too thick to be light transparent). In silicon wafer metrology, a total thickness variation (TTV) is obtaining in the form of data (map) which is used for wafer thickness control by a PACE figuring tool to achieve flattening.

Thus, the advantage of the apparatus of FIG. 1 using full field viewing of a wafer in situ in a tool station is that it can also be employed for silicon wafer flattening as well as for SOI wafer thinning. The metrology unit 16 in flattening applications will contain a wafer flattening metrology selected from several available units, for example, the aforesaid Micro-PMI and capacitance gauge units. However, in the present invention, a novel preferred embodiment of a wafer metrology unit for silicon wafer flattening is provided based, in part, on the Hartmann-Shack metrology described by Kwo et al. in the aforesaid SPIE Publication. This present invention is preferred because it represents small changes from the HDOS SOI metrology unit in the areas of light source, lensplate, and analysis algorithm.

Figure 4:
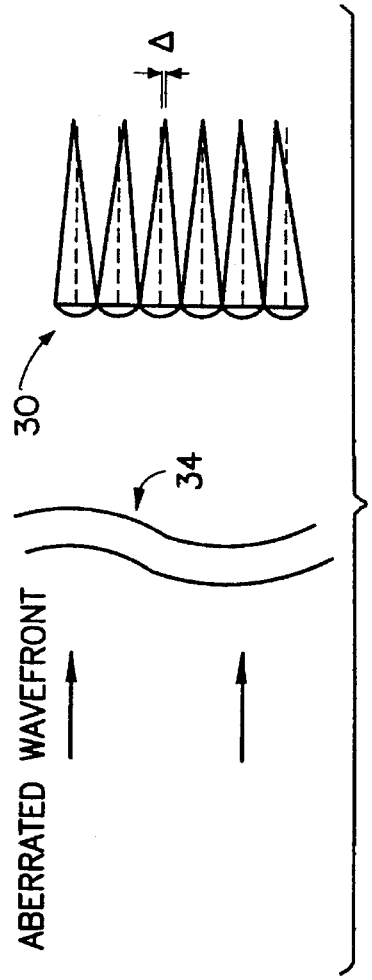
FIG. 4 is an illustration of a binary optic lenslet array responsive to light wavefronts that is used in the embodiments of the present invention.
Figure 5:
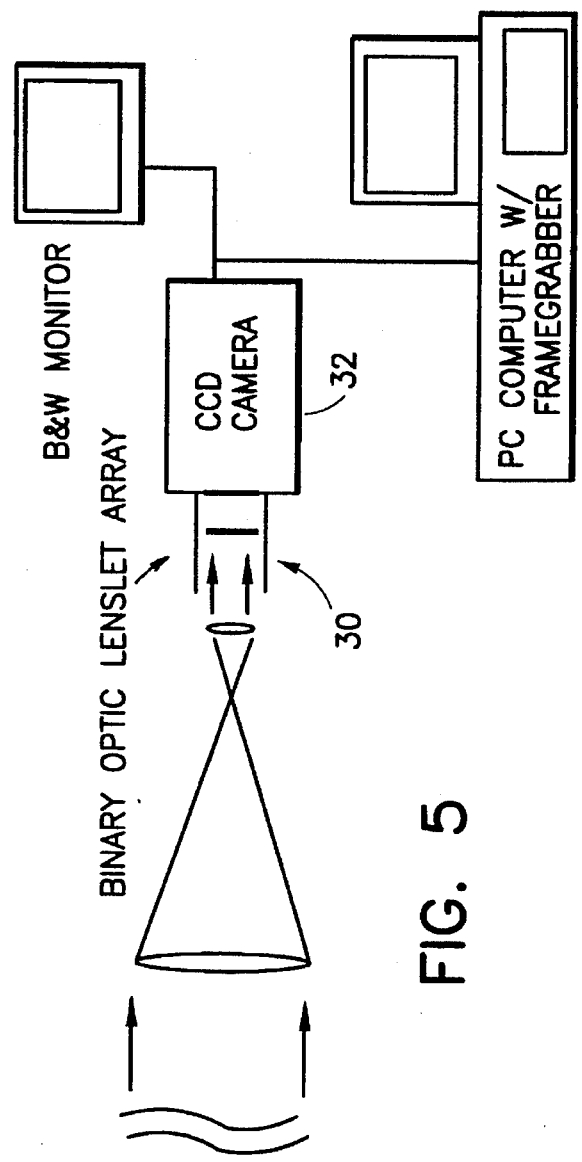
FIG. 5 is a schematic block diagram of a typical Hartmann-Shack Wavefront Sensor Apparatus.

The present invention uses prior art configurations of a Hartmann Wavefront Sensor modified and adapted to Total Thickness Variation (TTV) metrology for silicon wafers. The Hartmann Wavefront Sensor structure employed in the present invention uses a micro-optic lensplate 30 in combination with a charge-coupled-device (CCD) camera 32 as shown in FIG. 5. FIG. 4 shows a more detailed view of the lensplate portion 30 of FIG. 5 in greater scale. The lensplate 30 provides an array of spots representative of the incoming light wavefronts 34 onto the CCD camera. Lensplate 30 is designed to place each spot in the center of either a 2×2 pixel or 3×3 pixel grouping of the CCD camera 32.

Figure 6:
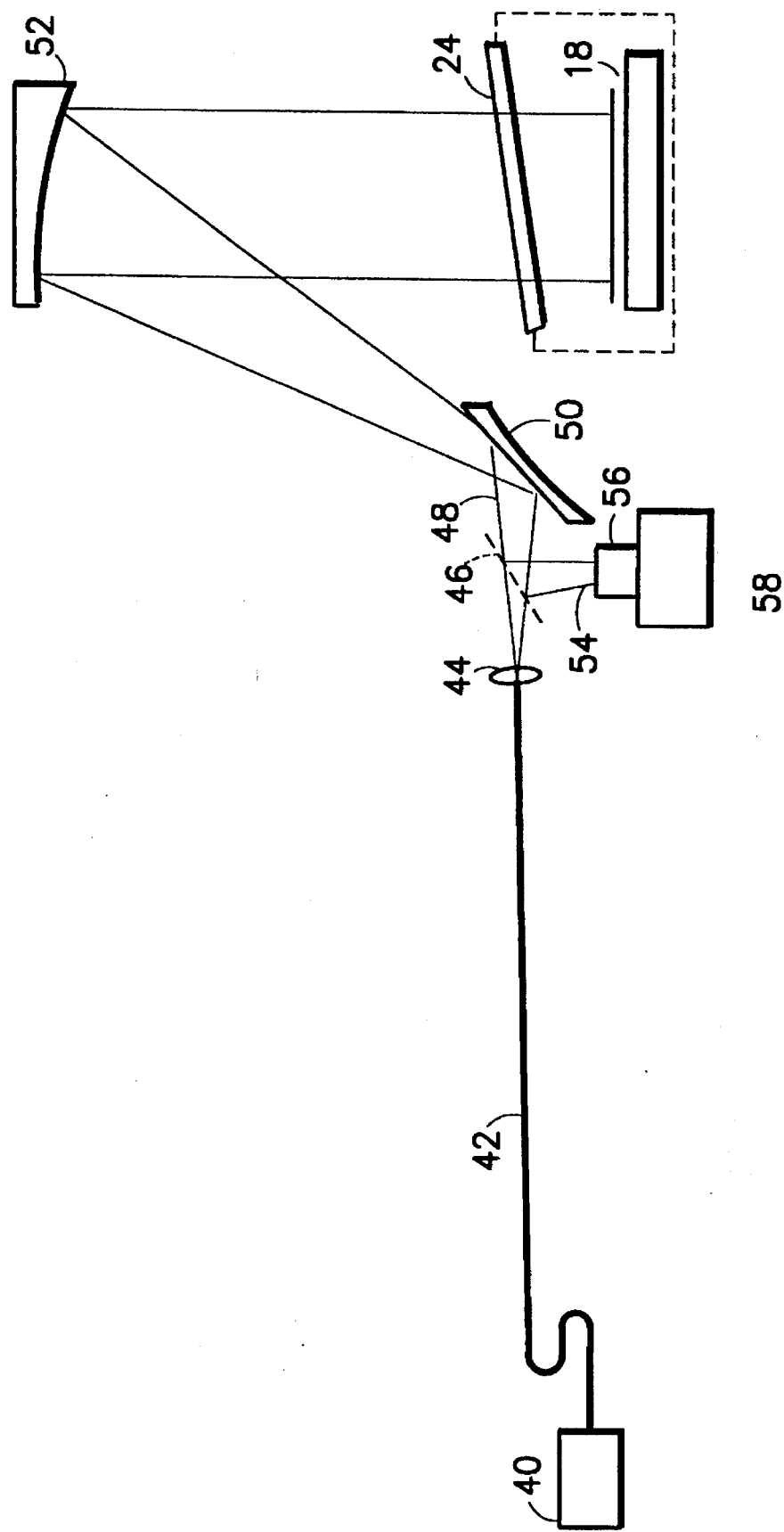
FIG. 6 is a schematic block diagram of an embodiment of a Total Thickness Variation (TTV) metrology apparatus according to the principles of the present invention.

The operation of the structures of FIG. 4 and FIG. 5 are fully explained in the publication by Kwo, Damas, Zmek and Haller cited in the Background of the Invention hereinabove. Referring to FIG. 6, a schematic illustration of a cross-section of a metrology unit for silicon wafer flattening in the apparatus of FIG. 1 is shown including a light source 40 such as a laser. The light from source 40 is transmitted via a single mode source fiber 42 to a lens 44. The light passes through the lens 44 and beam splitter device 46. The light beam 48 continues onto and is reflected from a mirror 50 onto an off-axis parabolic reflector 52, which reflects the light 48 through the window 24 of the metrology unit and onto the wafer plane of the wafer chuck 18. The silicon wafer in the wafer plane is "chucked" on a flat chuck to eliminate any bow, warp or sori. The only thickness variation detected will be that of the wafer.

The light is reflected from the wafer surface, which is assumed not to be flat. The light is then reflected back off reflector 52 and mirror 50 onto beam splitter device 46 which directs the light onto an image lens 54 that contains an internal stop. The light from lens 54 is projected onto a micro lens plate 56 as illustrated in FIG. 4. And then onto a CCD camera 58.

Figure 7:
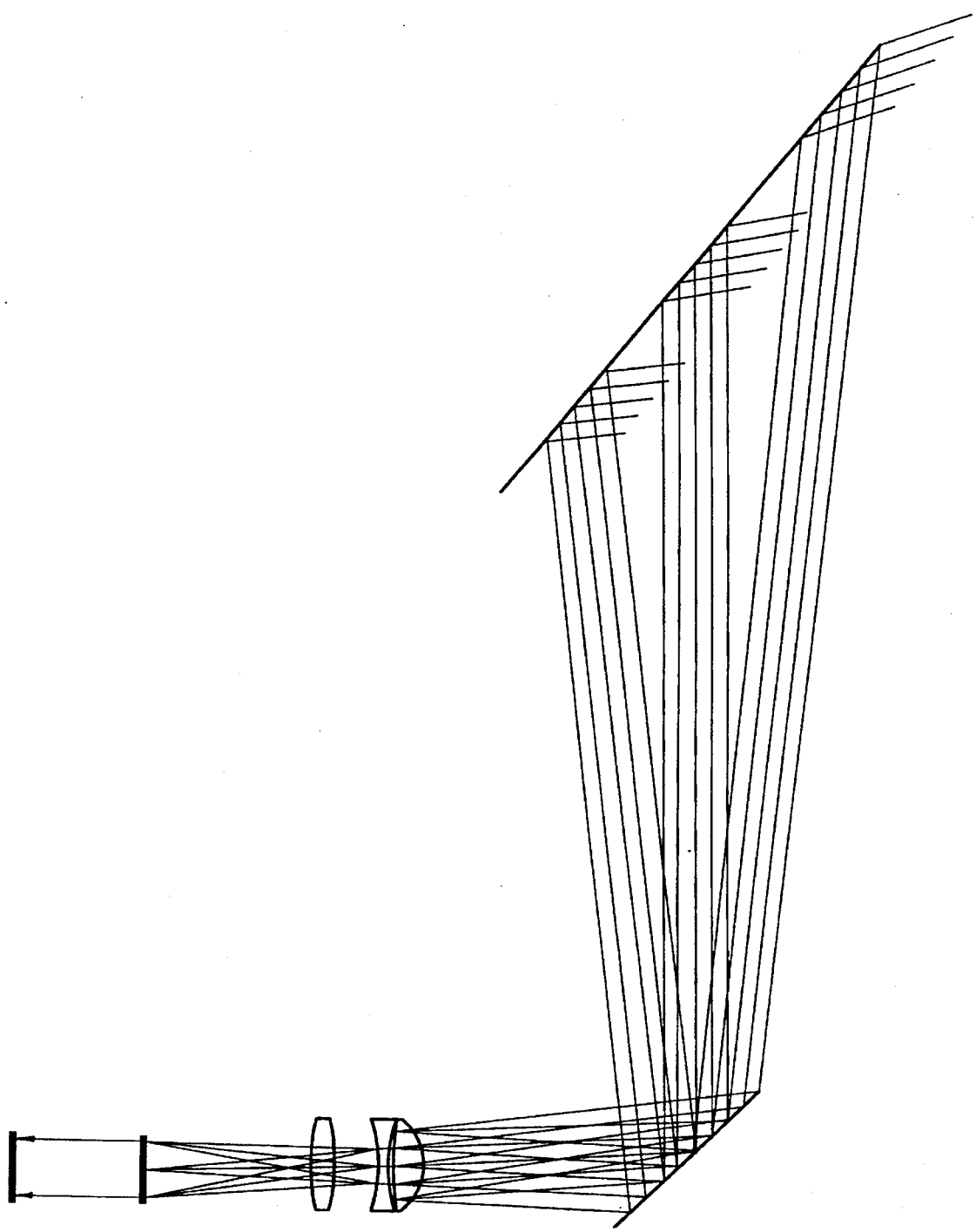
FIG. 7 is a schematic illustration of a detailed view of a light path for the apparatus of the present invention.
Figure 8:
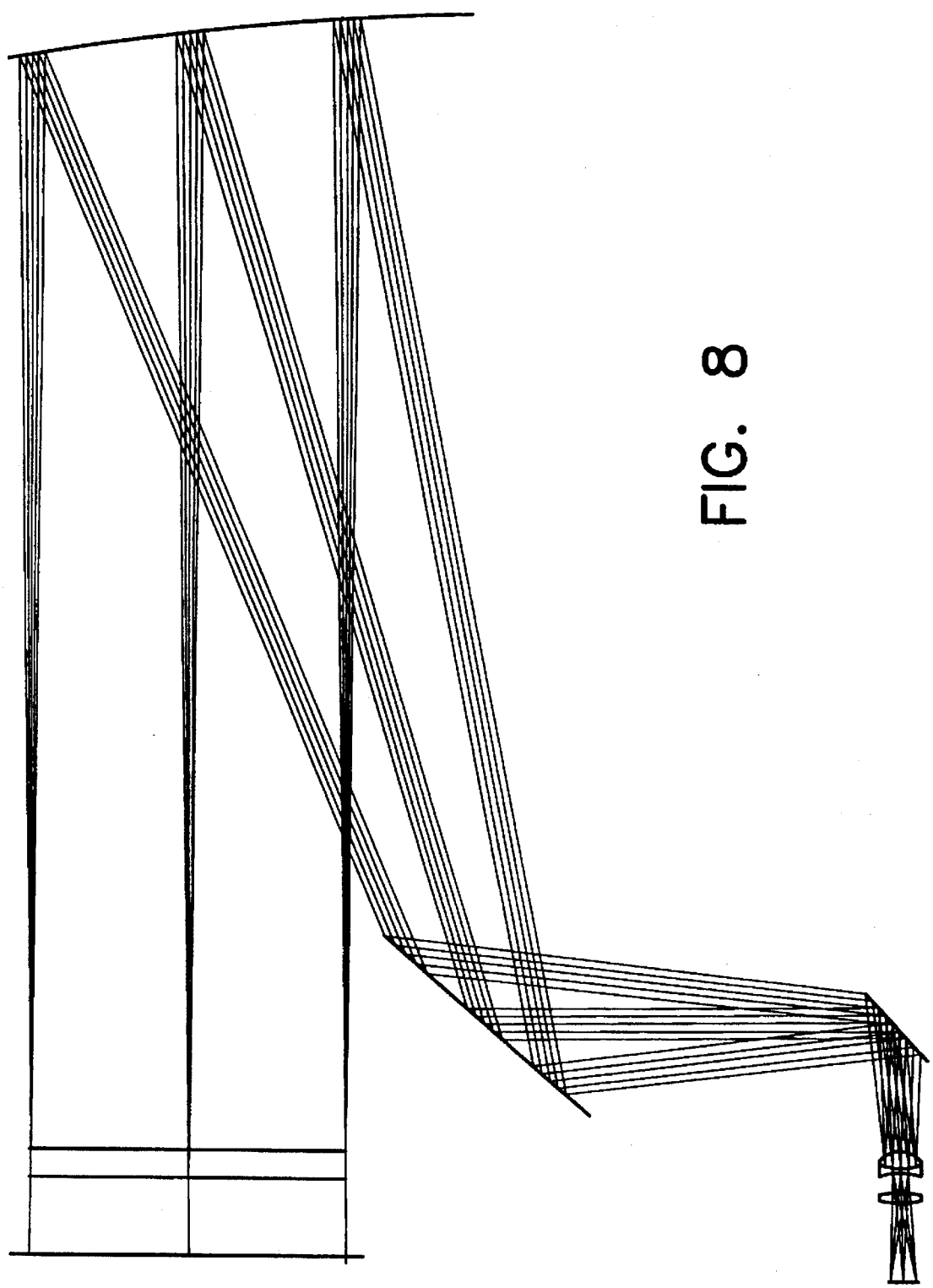
FIG. 8 is a schematic illustration of a detailed view of another light path for the apparatus of the present invention.

FIGS. 7 and 8 are provided to show the details of the SOI metrology unit imaging optics.

If one observes a flat surface with the apparatus of FIG. 6, one sees a regular array of spots in the camera display. The lensplate 56 is designed to place each spot in the camera display in the center of either a 2×2 pixel or 3×3 pixel grouping. If the flat surface is replaced by a surface with thickness variations, the spots move by an amount proportional to the slope of the surface at the area being sampled by the lensplate. Knowing the geometry of the CCD array and the optical setup, the thickness variation can be calculated by a wavefront reconstruction algorithm such as described and used by Kwo et al.

It should be appreciated that the apparatus of FIG. 6 is a metrology unit for silicon wafer flattening, and although well suited for use as a metrology unit for the down-looking configuration as shown in FIG. 1, may nevertheless be used by itself as an independent metrology unit. The advantages of this novel apparatus for silicon wafer flattening can also be realized even if the flattening tool is located in a different place.

Figure 9:
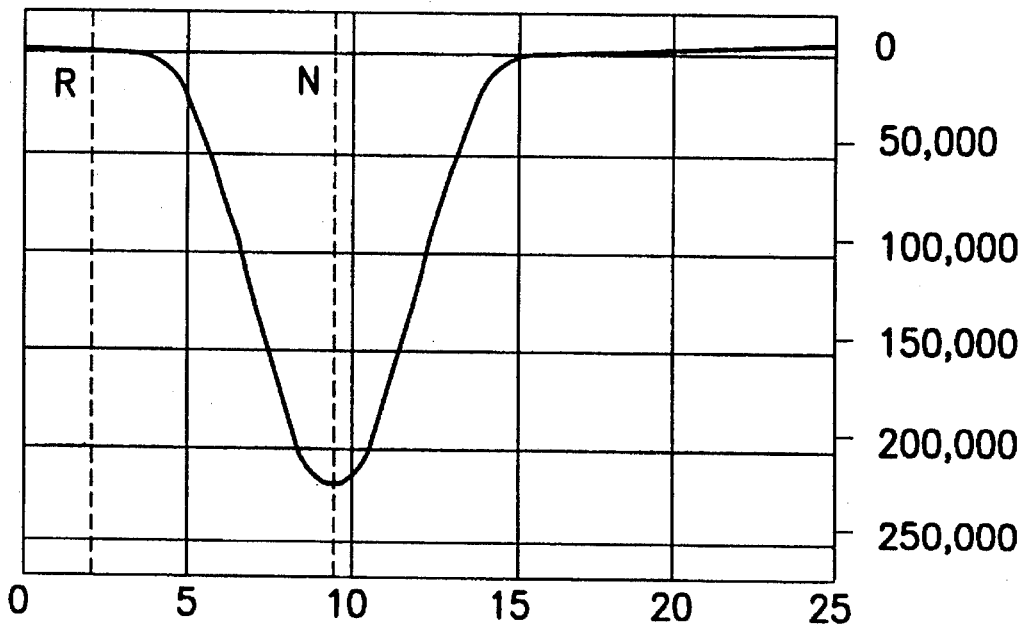
FIG. 9 and FIG. 10 are curves which illustrate data profiles of tool footprints such as would result from the operation of the apparatus of FIG. 4.
Figure 10:
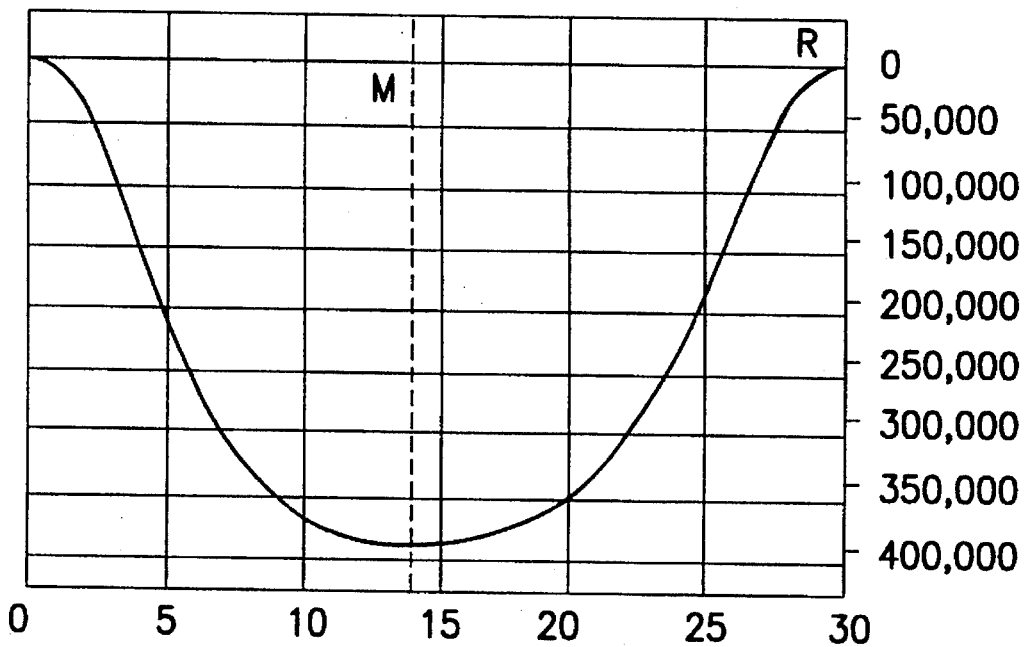

The metrology unit described herein and illustrated in the embodiment of FIG. 6 can be used as described previously for other applications, one key application being the measurement of tool footprint profiles in either static spot or dynamic trough forms. As previously stated, the metrology unit senses the aberrated wavefronts from the surface of a wafer. Profiles of large diameter tools are difficult to measure using mechanical profile devices. In known techniques, tool footprints are characterized by etching a pattern (i.e. depression) in a silicon wafer and measuring its depth profile along its diameter with a mechanical profile measurement device. The metrology unit of the present invention spans the area of the footprint (and more), and can characterize the tool shape by looking at the slopes of the surface of the etched depression. The measured footprint of the etched depression relates to the shape of the tool and deviations (i.e. determined by variations in the slopes) can be directly measured. The amount of ray deviations and, hence the spot separations of the light in the plane of CCD camera are determined. Spot deviations greater than tool calibration spot spacing can be processed by known algorithms. Referring to FIG. 9, the profile of a small tool as might be obtained by the system of FIG. 6 is shown, and FIG. 10 illustrates the profile of a large tool.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. A system for wafer processing comprising:

means for retaining at least one wafer to be processed;

a vacuum chamber means containing a plurality of work stations and at least one wafer processing machine;

transport means mechanically connected to said wafer retaining means for transporting said wafer into a selected one of said plurality of work stations in said vacuum chamber proximate to said wafer processing machine;

and a metrology apparatus disposed above said wafer in said work station for directing light down onto said wafer for measuring light wavefronts reflected from said wafer wherein said vacuum chamber includes means for positioning said selected work station below said metrology apparatus and said metrology apparatus includes a light source for directing a light beam onto said wafer in said work station in said vacuum chamber wherein said light beam is reflected from the surface of said wafer in the form of reflected light wavefronts; and a light responsive measuring means in the path of said reflected light beam wavefront including a lens array having a plurality of separate lens elements disposed for producing a plurality of light spots representative of said reflected light beam wavefronts, and means responsive to said plurality of light spots from said lens array for determining the relative spacing between said light spots.

2. A system for wafer processing according to claim 1 wherein said vacuum chamber includes a plurality of work stations and means for positioning said metrology apparatus above selected one of said plurality of work stations.

3. A system for wafer processing according to claim 1 wherein said wafer to be processed is a silicon wafer:

said wafer processing machine is a wafer flattening machine;

and said metrology apparatus is an apparatus for measuring silicon wafer flatness when said silicon wafer is in said work station in position for flattening by said wafer flattening machine.

4. A system according to claim 3 wherein said silicon wafer has a footprint or co-registration pattern made by a PACE shaper.

5. A system for wafer processing for flattening according to claim 1 wherein said light source is a laser, and wherein said metrology apparatus further includes a beam splitter device in the path of said light beam for directing said light beam onto a said wafer in said work station in said vacuum chamber wherein said light beam is reflected from the surface of said wafer back through said beam splitter device in the form of reflected light wavefronts;

and wherein said lens array of said light responsive measuring means in the path of said reflected light beam wavefronts from said wafer reflected back through said beam splitter device is provided for determining the flatness of the said surface of said wafer.

6. A system for wafer processing according to claim 5 wherein said means responsive to said plurality of light spots representative of said reflected light beam wavefronts, includes a charge-coupled-device light detector responsive to said plurality of light spots from said lens array for determining the relative spacing between said light spots representative of the flatness of said surface of said wafer.

7. A system for wafer processing according to claim 6 wherein said metrology apparatus further includes a reflective mirror structure disposed between said beam splitter device and said wafer in said work station for directing said light beam directly down onto said surface of said wafer, and for directing said light beam wavefronts reflected from said wafer surface back through said beam splitter device.

8. A system for wafer processing according to claim 7 wherein said work station includes a wafer chuck for retaining said wafer in a flat position beneath said light beam directed down onto said surface of said wafer from said metrology apparatus.

9. A system for wafer processing according to claim 7 wherein said reflective mirror structure includes an off-axis parabolic reflector for directing said light beam down onto said wafer in said work station, and for directing said light beam wavefronts reflected from said wafer surface back through said beam splitter device.

10. A system for wafer processing according to claim 1 wherein said transport means includes a motor actuated pivoted mechanical arm for said wafer in said retaining means and physically transporting said wafer and placing said wafer in said work station in said vacuum chamber.

11. A system for wafer processing according to claim 10 wherein said wafer retaining means includes means for retaining a plurality of separate wafers to be processed and wherein said vacuum chamber means includes a plurality of separate work stations;

and wherein said motor actuated pivoted mechanical arm of said transport means functions to physically transport each of said plurality of separate wafers and place each of said plurality of separate wafers in each of a separate one of said plurality of separate work stations.

12. A system for wafer processing according to claim 11 wherein said vacuum chamber includes a plurality of work stations and means for positioning said metrology apparatus above selected one of said plurality of work stations.

* * * * *